United States Patent [19]

Benson

[11] Patent Number: 5,494,191

[45] Date of Patent: Feb. 27, 1996

[54] FLUID CONTAINING AND DISPENSING SYSTEM

[75] Inventor: Robert D. Benson, White Bear Lake, Minn.

[73] Assignee: Core Incorporated, White Bear Lake, Minn.

[21] Appl. No.: 236,199

[22] Filed: May 2, 1994

[51] Int. Cl.⁶ ..................................................... B67D 5/40
[52] U.S. Cl. ............................... 222/23; 222/71; 222/608; 222/189.09; 222/189.11; 222/385
[58] Field of Search .................................. 222/23, 71–74, 222/189.09, 189.11, 385, 464, 608, 383.1, 383.2, 383.3

[56] References Cited

U.S. PATENT DOCUMENTS

| | | | |
|---|---|---|---|
| 1,436,056 | 11/1922 | Sherwood | 222/628 |
| 1,646,477 | 10/1927 | Davis et al. | 222/628 |
| 1,694,624 | 12/1928 | Piquerez. | |
| 1,860,716 | 5/1932 | Lockwood | 222/383.3 X |
| 2,169,514 | 8/1939 | Buzzard et al. | 222/189.11 |
| 2,431,534 | 11/1947 | Benner | 222/383.3 |
| 2,461,197 | 2/1949 | Chambers | 62/89 |
| 2,620,940 | 12/1952 | Ginter | 222/130 X |
| 2,777,610 | 1/1957 | Fox et al. | 222/130 |
| 2,894,541 | 7/1959 | Marban | 141/30 |
| 3,095,062 | 6/1963 | Neely | 222/464 X |
| 3,101,102 | 8/1963 | Gearhart et al. | 141/209 |
| 3,129,836 | 9/1963 | Frevel | 220/1 |
| 3,833,156 | 9/1974 | Hough | 222/383.3 |
| 3,863,688 | 2/1975 | Millar et al. | 141/59 |
| 3,946,894 | 3/1976 | Simkus | 220/256 |
| 3,958,719 | 5/1976 | Ward | 220/288 |
| 4,570,833 | 2/1986 | Vanderjagt | 222/385 X |
| 4,685,592 | 8/1987 | Vanderjagt | 222/383.3 X |
| 5,064,101 | 11/1991 | Richter et al. | 222/143 |
| 5,209,377 | 5/1993 | Steiner et al. | 222/189.09 |

OTHER PUBLICATIONS

Advertising piece of Malabar International, date unknown but before 1993.

Excerpt from Jan. 7, 1991 report of Robert D. Benson (present applicant) to Northwest Airlines, showing hand pump cart in use over one year before present application filed.

Primary Examiner—Kevin P. Shaver
Attorney, Agent, or Firm—Richard E. Brink

[57] ABSTRACT

A container and dispenser for fluids, especially hydraulic and engine oil fluids for aircraft. The container, which is preferably made of a recyclable polymer such as high density polyethylene, is rectangularly parallepipedal, with a crowned top to minimize contamination by water or particulate matter. A pump is mounted on the top of the container, and various filters, check valves, and quick disconnect couplings are provided to further minimize contamination. In use, the container is mounted on a 2-wheeled cart that is especially designed to accommodate it.

10 Claims, 3 Drawing Sheets

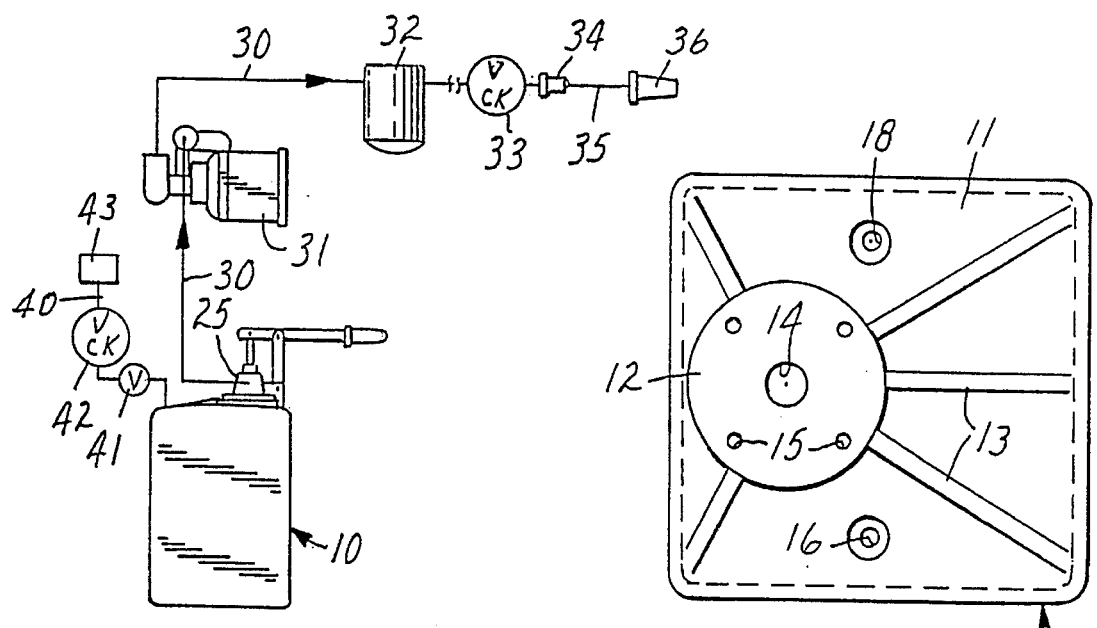
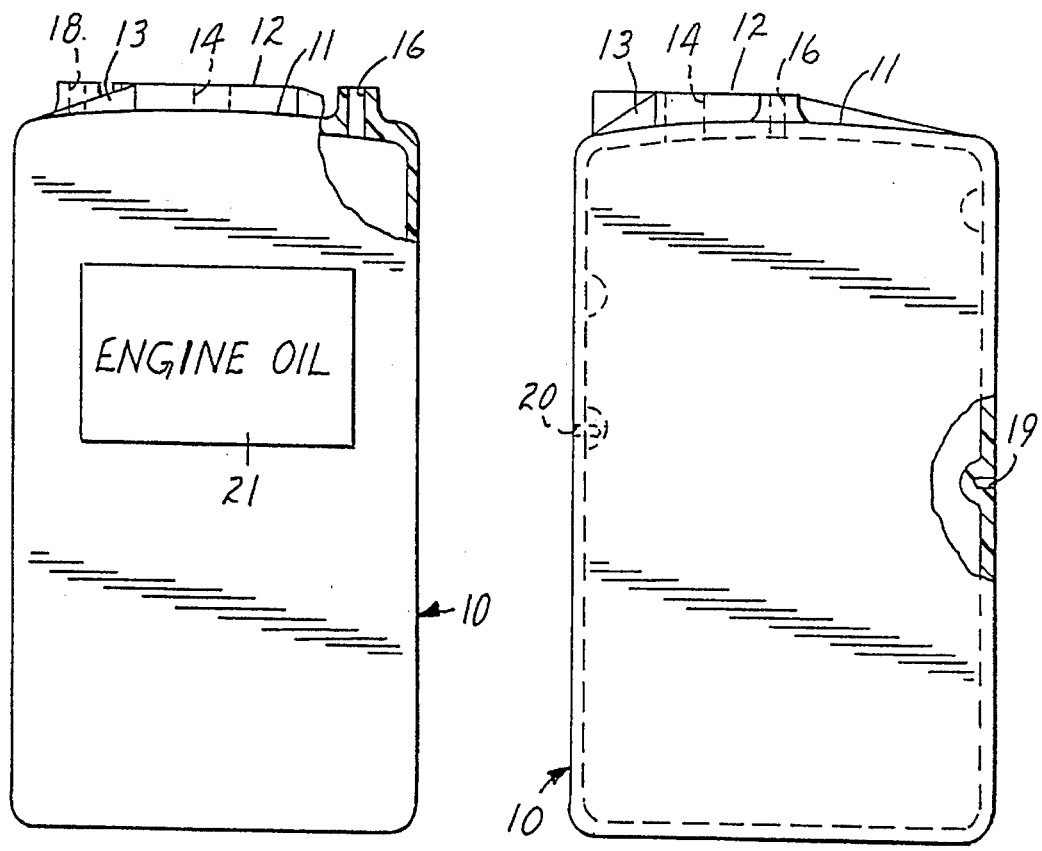
FIG.1  FIG.4  FIG.2  FIG.3

FLUID CONTAINING AND DISPENSING SYSTEM

BACKGROUND OF THE INVENTION

This invention relates to systems for containing and dispensing fluids and is particularly concerned with systems for containing, transporting, and dispensing hydraulic fluids and engine oils for jet airplanes.

Hydraulic fluids find numerous commercial uses, an especially common application being in the aircraft industry, where they are employed in the systems that operate the rudder, wing flaps, landing gear, etc. It is extremely important that these fluids be protected from dirt and water, both of which can cause serious damage to the hydraulic systems of aircraft. Hydraulic fluids are also extremely corrosive and are especially damaging to painted surfaces, and great care must be exercised to avoid spillage, both in filing the containers and in servicing the aircraft. Synthetic engine oils are hygroscopic and especially susceptible to contamination with water, which reacts with phosphate esters in the oil to produce a highly corrosive acid that etches the metal of the engine and causes serious damage. The deleterious effect of dirt in lubricating oil is even more pronounced than in hydraulic fluid.

In servicing aircraft, a container of fluid (i.e., hydraulic fluid or engine oil) is moved to the aircraft, hoses extending from the container connected to the appropriate system on the aircraft, and the fluid pumped into the system. For many years it has been common to use containers that are 5-gallon tanks made of corrosion-resistant stainless steel incorporated in a two-wheeled cart to facilitate moving to and from the aircraft to be serviced. To fill this tank, a large fill cap on the top is opened, exposing the interior of the container to the atmosphere, which is inevitably contaminated with moisture and dust particles. In humid weather, moisture condenses on the metal tank, inevitably resulting in the presence of water in the contents. Further, the useful life of the tanks is on the order of two years, after which they develop stress cracks, through which the fluid seeps. These cracks cannot be successfully repaired by welding, so the tank must be disposed of, a process more expensive than might be realized. Environmental regulations require that the tanks be cut in half and solvents used to leach out the oil clinging to the interior surfaces. rior surfaces. Disposal of the fluid-containing solvent then presents a still further expensive problem. Additionally, because the stainless steel tank and the cart form an integral unit, the entire unit is effectively destroyed when the tank must be replaced.

At least one airline in recent years has replaced the stainless steel pump cart with a flat-topped crosslinked polyethylene tank removably mounted on a two-wheeled wire-formed cart to which it is attached by bolting an angle plate to the rear portion of the top. A hand pump, vent fitting, and a self-sealing quick disconnect fill fitting extend through the plate into the tank. The angle plate is then attached to a flat plate on the back of the cart, so that a damaged tank can easily be removed and replaced. The quick disconnect fill fitting provides for clean, uncontaminated entry of fluid into the tank. A coalescent filter is mounted on the vent to dry the air that enters the container as the fluid is pumped out. A filter is also inserted in the dispensing line to block any particulate matter that may be entrained in the fluid. A spring-loaded check valve is inserted in the air vent line to prevent the entry of fluid if the cart is overturned. Moisture does not condense in or on the polyethylene tank in the same way it does on a stainless steel tank.

Although the containing and dispensing system just described offers a significant improvement over its stainless steel predecessor, it is not without its own problems. For example, a gasket seal is provided between the angle plate and the flat top of the tank, permitting the seepage of fluid laterally through the gasket, especially as it shrinks and disintegrates with age, and occasionally allowing the entry of moisture and particulate matter that is inevitably present on the flat top of the tank. To some extent, the same problem exists with respect to the quick disconnect fill fitting. The lower front edge of the polyethylene container is subjected to abrasive wear as the cart is moved from place to place. The drying filter for the vent does not completely block the entry of particulate matter. The crosslinked polyethylene tank can not be recycled. The wire-formed cart is susceptible to twisting and distortion. The steel wheel bearings on the cart tend to be adversely affected by cold weather, and the aluminum wheels themselves are attacked by exposure to the environment and water-contaminated engine oil. If the cart is inadvertently overturned, there is highly undesirable oil leakage from the line through which venting air is supplied, the dual spring-loaded check valve arrangement in the line being unable to prevent this problem.

The present invention is directed to improving the polyethylene tank and cart to overcome the problems just discussed.

BRIEF SUMMARY

The present invention retains the advantages of the prior art polyethylene tank and accompanying system while overcoming its disadvantages. The tank is preferably formed from a polymer such as high density polyethylene, which (unlike crosslinked polyethylene) can be recycled. The fill system is improved, so as to prevent inadvertent contamination by dust and moisture. Gaskets are eliminated, thereby eliminating the seepage and contamination problems caused as gaskets age. In currently preferred embodiments, the cart is strengthened to enhance its rigidity. A greatly improved filter is mounted in the vent line. Perhaps most significantly, the pump location on the container top and the check valve in the air supply line have been modified so that, if the cart is overturned, no leakage of occurs.

In accordance with the invention, a polymeric tank, resistant to corrosive fluids such as hydraulic fluids and synthetic engine oils, is provided with a crowned top. The crowned top prevents the collection of water, oil, and grit, which might contaminate the fluid. At the front portion of the tank a pump is mounted, extending downward into the container. The tank is seated in a basket that is integral with a cart, the back of the tank being attached to the cart. On the crowned top of the tank is mounted a quick disconnect fitting that opens into the tank, so as to provide a means for filling. Also on the crowned top of the tank is another fitting that opens into the tank, providing for the entrance of venting air as fluid is pumped out. This fitting is provided with a spring-loaded poppet valve, which can be depressed by hand to allow air to escape when the container is being filled but otherwise remains closed so that fluid cannot escape if the tank is overturned.

BRIEF DESCRIPTION OF THE DRAWING

Understanding of the invention will be enhanced by referring to the accompanying drawing, in which like numbers refer to like parts in the several views, and in which:

FIG. 1 is a flow diagram, showing the way fluid is pumped from the tank of the invention;

FIG. 2 is a front elevation of the tank, with some parts broken away and shown in section to facilitate understanding;

FIG. 3 is a right elevation of the tank, again with some parts broken away and shown in section to facilitate understanding;

FIG. 4 is a top view of the tank prior to installing a pump and other fittings;

DETAILED DESCRIPTION

Figure 5:
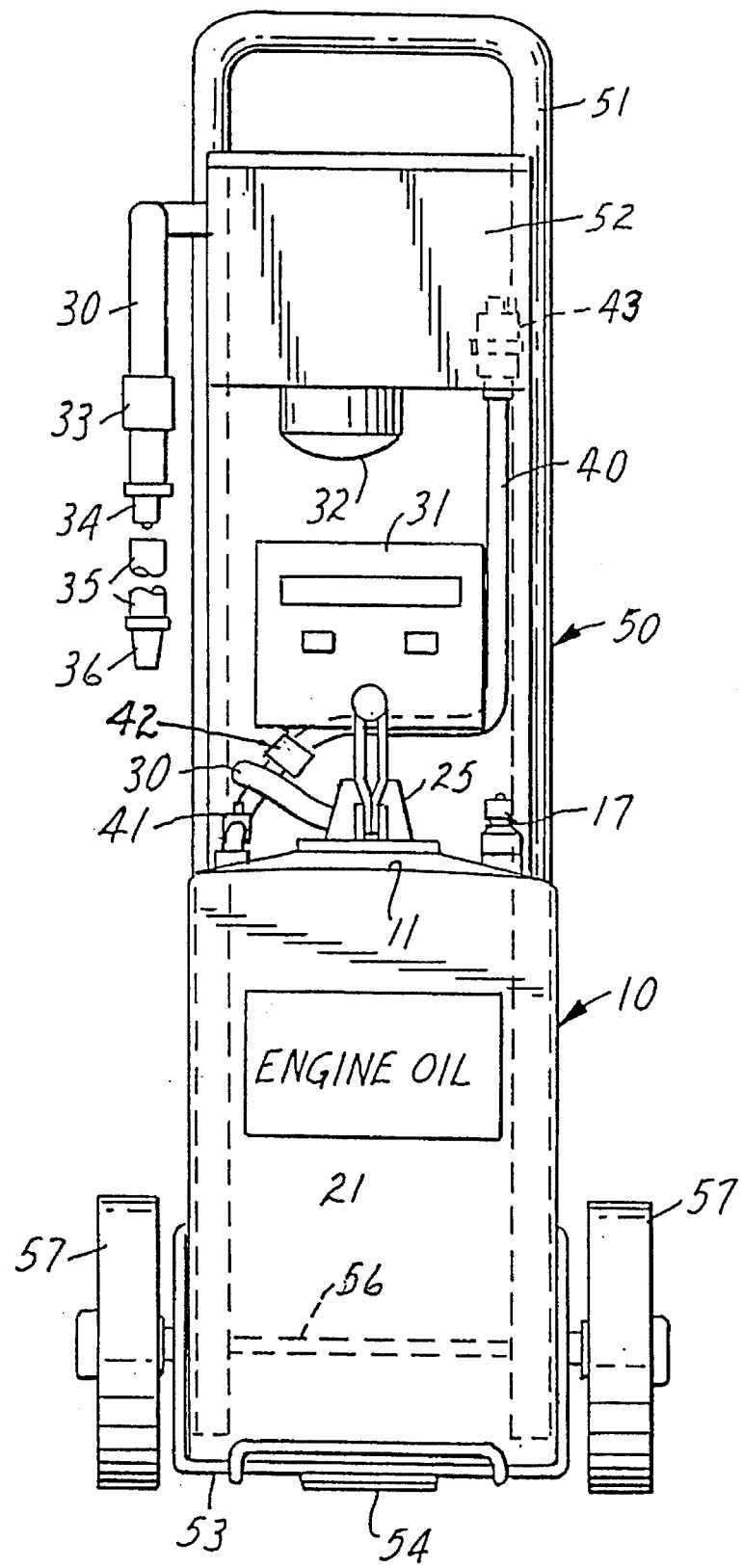
FIG. 5 is a front view of an oil-dispensing system comprising the tank mounted on a cart, with the pump and other fittings installed.

Understanding of the invention will be further enhanced by reference to the following description of a currently preferred but nonlimiting embodiment.

In the drawings, tank 10 is a generally rectangular parallelepipedal container formed of linear polyethylene and having a crowned upper surface, or top, 11. As is shown in FIG. 4, upper surface 11 incorporates strengthening ribs 13 and planar support 12 for pump 25. In the center of pump support 12 is hole 14, through which the supply line for pump 25 is inserted, extending to the bottom of tank 10. Surrounding hole 14 are drilled and tapped holes 15 for mounting pump 25, a gasket or O-ring (not shown) optionally being interposed. Also present in top 11 are fill hole 16, provided with quick disconnect coupling mounting pump 25, a gasket or O-ring (not shown) optionally being interposed. Also present in top 11 are fill hole 16, provided with quick disconnect coupling 17, which is protected by a cap (not shown) except when tank 10 is being filled. Vent hole 18 is also present in top 11, vent line 40 being connected to vent hole 18 through poppet valve 41 and check valve 42. Poppet valve 41 is normally closed but is opened manually to relieve pressure when tank 10 is being filled. Check valve 42 is normally closed but opens when removal of fluid from tank 10 creates a negative pressure, thereby permitting the entry of air. At the distal end of vent line 40 is 2-stage air filter 43, which not only dries the air entering the tank but also traps any particulate matter entrained in the air. Pump 25 has as its outlet oil-dispensing line 30, which leads through meter 31 and filter 32, terminating in check valve 33 and quick disconnect coupling 34. When it is desired to dispense oil, a suitable hose (sometimes referred to as a tool), preferably terminating in dripless spout 36, is attached to quick disconnect coupling 34. The operation of pump 25 draws oil from tank 10, forcing it through line 30, meter 31, filter 32, check valve 33, and into dispensing hose 35.

At the front of tank 10 are drilled and tapped holes 20, which may be used to mount identity plate 21.

Figure 6:
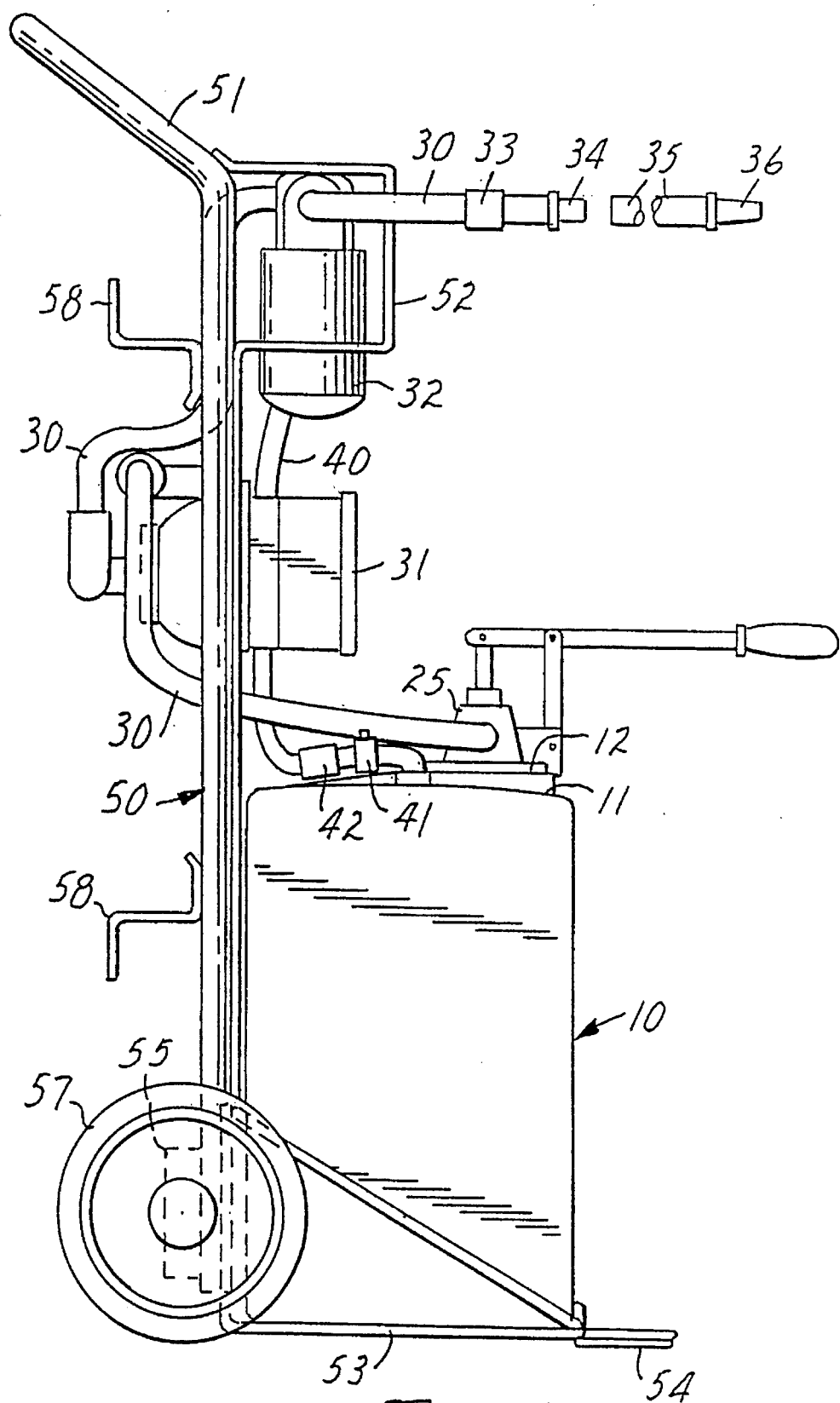
FIG. 6 is left elevation of the oil-dispensing system of FIG. 5.

FIGS. 5 and 6 depict tank 10 and the associated dispensing equipment, mounted on cart 50 for portability. Cart 50 comprises tubular steel frame 51, strengthened and rigidified by plate 52, with wire basket 53 located at the lower end. The exposed portions of cart 50 are preferably provided with a protective polymeric coating, e.g., epoxy resin, which may be color-coded to aid in identifying the particular fluid contained in tank 10. Tank 10 is provided with drilled and tapped holes 19, bolts being inserted through holes in plate 52 and threaded into holes 19. Tank 10 is also positioned in and supported by basket 53, the lower end of which extends forward, thus helping to protect tank 10 from injury. Located on the lower surface of the extended portion of basket 53 is skid plate 54, which helps prevent scuffing of the polymeric coating on the lower side of the basket, with subsequent rusting of the exposed steel. At the lower rear of frame 51 axle support 55 is attached, axle 56 extending therethrough, with wheels 57 mounted on axle 56. Attached to the back of frame 51 is hose support 58, on which dispensing hose 35 may be coiled when not in use. At the present time, applicant prefers ¼-inch high density polyethylene as the polymer from which to form tank 10. This polymer is strong, able to withstand temperature extremes, highly resistant to the corrosive effects of hydraulic fluids, and readily recyclable. It will be understood, of course, that other suitable polymers could also be employed.

Reference has been made to the ability of the tank of the invention to resist leakage, even when overturned. A tank mounted on a cart is more likely to tip over backward than any other direction, and the location of vent hole 18 at the forward portion of tank 10 minimizes the chance that oil will exit through hole 18. The location of pump 25 at the forward end of tank 10 distributes the force resulting from activation of pump 25 along the vertical front edge of tank 10, obviating any necessity of providing a steel plate to support the pump, as was required in the prior art system.

Although the invention has been described with particular reference to hydraulic fluids and engine oil for use in servicing aircraft, it will be apparent that it would be useful in connection with other types of fluid, especially corrosive or hygroscopic fluids, Without in any way intending to be limited thereby, such fluids might include automotive lubricating oil, pesticides, herbicides, cola syrups, etc. Accordingly, the scope of the invention is to be determined by the following claims, giving full credence to the doctrine of equivalents.

What is claimed is as follows:

1. A polymeric tank for use as a container and dispenser of fluids, said tank being of generally rectangular parallelepipedal shape, having a front, a back, a bottom, two sides, and a crowned top to minimize the collection of water, oil and grit, a pump having an inlet side and an outlet side mounted at the front portion of the top, a supply line extending from the inlet side of the pump downward into the tank to permit the delivery of the fluid in the tank to a fluid-dispensing line connected to the outlet side of the pump, a quick disconnect fitting that opens into the tank so as to provide a means for filling the tank, a venting fitting that opens into the tank to provide for the entrance of air as fluid is pumped out of the tank, an air supply line connected to said venting fitting, and a check valve to block the entrance of fluid into said air supply line.

2. The invention of claim 1 wherein the venting fitting is located in the forward portion of the tank top, further reducing any tendency for oil to enter the venting line in case the tank is overturned.

3. The invention of claim 2 wherein the tank is made of recyclable polymer.

4. The invention of claim 3 wherein the polymer is high density polyethylene.

5. The invention of claim 2 wherein the fluid-dispensing line includes a hose, a meter for measuring fluid output, an oil filter, and a check valve to prevent the backward flow of dispensed fluid in the hose.

6. The invention of claim 5 wherein a 2-stage filter is connected to the distal end of the air supply line, said 2-stage filter being capable of removing both moisture and entrained particulate material from the air.

7. The invention of claim 6 mounted on a 2-wheeled cart having at its lower end a basket to support the tank.

8. The invention of claim 7 wherein the cart comprises a generally U-shaped tubular metal frame having a rigidifying steel plate affixed thereto, the back of the tank being bolted to the steel plate.

9. The invention of claim 8 wherein a protective skid plate is provided at the lower forward end of the basket.

10. The invention of claim 9 wherein the exposed surfaces of the cart are protectively coated with an epoxy resin that is suitably colored to indicate the contents of the tank.

\* \* \* \* \*